(12) United States Patent
Martinez

(10) Patent No.: US 9,086,502 B2
(45) Date of Patent: Jul. 21, 2015

(54) SYSTEM AND METHOD OF A MARINE SURVEY USING VERTICALLY ORIENTED SENSOR STREAMERS

(75) Inventor: Ruben D. Martinez, Sugarland, TX (US)

(73) Assignee: PGS Geophysical AS, Oslo (NO)

( * ) Notice: Subject to any disclaimer, the term of this patent is extended or adjusted under 35 U.S.C. 154(b) by 965 days.

(21) Appl. No.: 13/154,643

(22) Filed: Jun. 7, 2011

(65) Prior Publication Data

US 2012/0314535 A1  Dec. 13, 2012

(51) Int. Cl.
| | | |
|---|---|---|
| G01V 1/38 | (2006.01) | |
| G01V 1/20 | (2006.01) | |
| G01V 1/16 | (2006.01) | |
| G01V 1/18 | (2006.01) | |

(52) U.S. Cl.
CPC ........ *G01V 1/20* (2013.01); *G01V 1/166* (2013.01); *G01V 1/189* (2013.01); *G01V 1/3808* (2013.01); *G01V 1/201* (2013.01); *G01V 1/3852* (2013.01)

(58) Field of Classification Search
CPC ..... G01V 1/38; G01V 1/3808; G01V 1/3852; G01V 1/166; G01V 1/189; G01V 1/201
USPC ........................... 367/15, 20; 324/365
See application file for complete search history.

(56) References Cited

U.S. PATENT DOCUMENTS

| | | | | |
|---|---|---|---|---|
| 3,212,600 | A * | 10/1965 | Hensley, Jr. ..................... | 367/15 |
| 4,958,328 | A * | 9/1990 | Stubblefield ..................... | 367/15 |
| 4,970,697 | A * | 11/1990 | Earley et al. ..................... | 367/15 |
| 5,113,377 | A * | 5/1992 | Johnson ........................... | 367/20 |
| 5,257,241 | A | 10/1993 | Henderson et al. | |
| 6,442,490 | B1 | 8/2002 | Li et al. | |
| 7,834,632 | B2 | 11/2010 | Tenghamn et al. | |
| 7,881,159 | B2 | 2/2011 | Hegna et al. | |
| 8,098,542 | B2 * | 1/2012 | Hillesund et al. ............... | 367/20 |
| 8,134,369 | B2 * | 3/2012 | Helwig ........................... | 324/365 |

(Continued)

FOREIGN PATENT DOCUMENTS

| | | |
|---|---|---|
| EP | 2 068 175 A1 | 6/2009 |
| WO | WO 97/37246 | 10/1997 |

(Continued)

OTHER PUBLICATIONS

Lasse Amundsen et al., "Decomposition of Multicomponent Sea-Floor Data Into Upgoing and Downgoing P- and S-Waves," Geophysics, vol. 60, No. 2 (Mar.-Apr. 1995); pp. 563-572.

(Continued)

*Primary Examiner* — Ian J Lobo

(57) ABSTRACT

Marine surveys using vertically oriented sensor streamers. At least some embodiments are vertically oriented sensor streamers where each sensor streamer includes: an elongated outer jacket; a plurality of hydrophones coupled to the outer jacket, each hydrophone of the plurality of hydrophones longitudinally spaced along the outer jacket; a plurality of three-axis motion detectors, each three-axis motion detector of the plurality of three-axis motion detectors longitudinally spaced along the outer jacket; and a plurality of electrodes coupled to the outer jacket, each electrode of the plurality of electrodes longitudinally spaced along the outer jacket, and the plurality of electrodes electrically exposed outside the outer jacket. Other embodiments may also comprise a plurality of electrodes on each sensor streamer, the electrodes for measuring electromagnetic energy.

21 Claims, 5 Drawing Sheets

(56) References Cited

U.S. PATENT DOCUMENTS

| | | | |
|---|---|---|---|
| 2004/0042341 | A1 | 3/2004 | Tenghamn et al. |
| 2009/0140723 | A1* | 6/2009 | Ronaess et al. ............... 324/202 |
| 2011/0248718 | A1 | 10/2011 | Südow et al. |
| 2012/0026829 | A1* | 2/2012 | Hegna ............................ 367/21 |
| 2012/0057430 | A1* | 3/2012 | Rouquette et al. ............. 367/24 |

FOREIGN PATENT DOCUMENTS

| | | |
|---|---|---|
| WO | WO 01/37002 A1 | 5/2001 |
| WO | WO 2010/076646 A1 | 7/2010 |
| WO | WO 2012/036559 A1 | 3/2012 |

OTHER PUBLICATIONS

United Kingdom Search Report, mailing date: Sep. 17, 2012.
John Anderson, et al., "3D Vertical Cable Processing to Obtain a Pre-Stack Depth Migrated Image", SEG Expanded Abstracts 16, 1399 (1997).
Fred J. Barr, et al., "Attenuation of Water-Column Reverberations Using Pressure and Velocity Detectors in a Water-Bottom Cable", 59th SEG Annual Meeting, 653-655 (1989).
John Brittan, et al., "Applications of Adaptive Noise Attenuation to Dual Sensor Seismic Data", SEG Expanded Abstracts 22, 865 (2003).
Dan Ebrom, et al., "Permanently Instrumented Offshore Oilfields: Opportunities and Challenges", SEG Expanded Abstracts 18, 1986 (1999).
Folke Engelmark, "Reservoir Characterization and Monitoring of Cold and Thermal Heavy Oil Production Using Multi-Transient EM" (Abstract), SPE/PS/CHOA International Thermal Operations and Heavy Oil Symposium, October 20-23, 2008, Calgary, Alberta, Canada (2008).
David Hays, et al. "An Ocean Bottom Seismic Node Repeatability Study", SEG International Exposition and 78th Annual Meeting, Las Vegas, Nevada (2008).
Marco V. Vazquez, et al., "Improved Sihil Image From 4C Full Azimuth Node Data" (Extended Abstract), SEG Annual Meeting, Houston (2005).
Sergio Grion, et al., "Mirror Imaging of OBS Data", First Break, vol. 25 (Nov. 2007).
David Hill, et al., "Imaging Beneath Basalt Using an Over/Under Towed-Streamer Configuration", World Oil, May 2006 Issue, pp. 55-61 (2006).
Luc T. Ikelle, et al., "Potential Impacts of Vertical Cable (VC)", The Leading Edge, Oct. 1999, pp. 1154-1157.
Paulo Johann, et al., Geophysics and the Mature Fields Forum: Salvador, Bahia, Brazil (2008).
P.M. Krail., "Sub-Salt Acquisition With a Marine Vertical Cable", SEG Expanded Abstracts 12, 1376 (1993).
P.M. Krail, "Vertical Cable as a Subsalt Imaging Tool", The Leading Edge, Aug. 1994, pp. 885-887 (1994).
Martin Lando, et al., "Seismic Imaging Technology—Part 1: Acquisition", GEO Expo, Apr. 2008.
Nick Moldoveanu, et al. "Vertical Hydrophone Arrays Solve Challenges of Transition Zone Seismic Acquisition", World Oil, Jul. 2004 (2006).
Amal Ray, et al., "First Nodal OBS Acquisition From the Thunder Horse Field in the Deep Water of the Gulf of Mexico", Set International Exposition and 74th Annual Meeting, Denver Colorado (Oct. 10-15, 2004).
Seabed Geophysicaly, "Practical Applications for Node Seismic", First Break vol. 26 (Dec. 2007).
Yunqing Shen, et al., "3-D Prestack Reverse-Time Depth Migration Applied to Vertical Cable Seismic Data", SEG Expanded Abstracts, 19, 762 (2000).
Chuanwen Sun, et al., "Separation of Vertical Cable Up-Going and Down-Going Wave Fields", SEG Expanded Abstracts, 16, 1131 (1997).
Hejie Wang, et al., "The Impact of Multiple Suppression on Vertical Cable Data Imaging", SEG Expanded Abstracts, 19, 2173 (2000).
David Wright, et al. "Hydrocarbon Detection and Monitoring With a Multicomponent Transient Electromagnetic (MTEM) Survey", The Leading Edge, (Sep. 2002).
Terje Holten, et al., "Vertical Source, Vertical Receiver, Electromagnetic Technique for Offshore Hydrocarbon Exploration", First Break vol. 27, (May 2009).
Radmilo Gregovic, et al., "Propagation and Recording of Converted Shear Waves in a Simulated Marine Environment; Physical Model Study", SEG Expanded Abstracts 12, 942-945 (1993).
Are Osen, et al., "Decomposition of Particle Velocity Fields Into Up- and Downgoing P- and S-Waves", SEG Expanded Abstracts, 15, 743-746 (1996).
Robert Tatham, et al., "Separation of S-Wave and P-Wave Reflections Offshore Western Florida", Geophysics, vol. 49, No. 5, pp. 493-508, (May 1984).
Robert Tatham, et al., "Panel Discussion on Potential for Seismic Shear-Wave Applicaitons in the Marine Environment", Offshore Technology Conference 5405, 19th Annual Offshore Technology Conference, Houston, Texas, (Apr. 27-30, 1987).

* cited by examiner

SYSTEM AND METHOD OF A MARINE SURVEY USING VERTICALLY ORIENTED SENSOR STREAMERS

BACKGROUND

Underground hydrocarbon reservoirs are in many cases found beneath bodies of water, such as lakes or oceans. In the case of mature hydrocarbon producing fields, the surface of the water may be populated with equipment such as drilling platforms and production platforms. Moreover, the ocean bottom may be populated with drilling and production-related equipment such as production tubing, valves, lines, and anchors.

The relative density of drilling- and/or production-related equipment makes difficult the performance of marine surveys (e.g., seismic, electromagnetic) to gauge the state of the underlying hydrocarbon bearing formations. Thus, permanent or semi-permanent monitoring of mature hydrocarbon producing fields that reside beneath bodies of water is difficult.

BRIEF DESCRIPTION OF THE DRAWINGS

For a detailed description of exemplary embodiments, reference will now be made to the accompanying drawings in which.

NOTATION AND NOMENCLATURE

Figure 1:
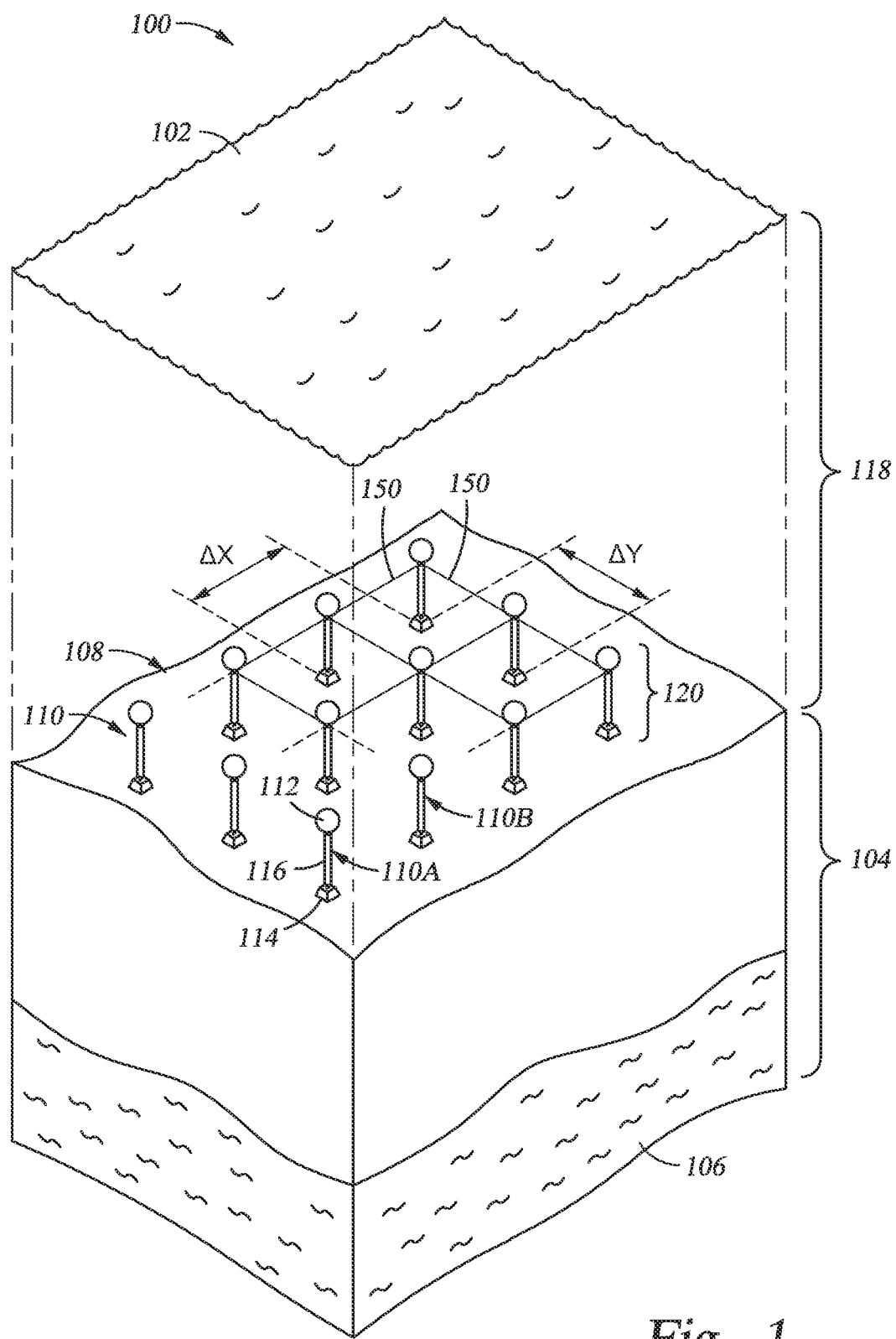
FIG. 1 shows a perspective view of a marine survey system in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Substantially" shall mean, with respect to longitudinal placement along a streamer, that two or more devices are within +/−5 centimeters of a designated location.

"Substantially" shall mean, with respect to vertical orientation of a device, within +/−15 degrees of vertical in the absence of water currents.

"Acoustic energy" shall refer to pressure waves travelling in water and/or an earth formation, and shall include both audible and non-audible energy.

"Vertically oriented" with respect to a sensor streamer deployed in a body of water refers to an orientation of the sensor streamer in the absence of water currents. In operation, water currents and other conditions may cause sensor streamers to tilt, but such tilting of the sensor streamers does not obviate that the sensors are "vertically oriented."

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

The various embodiments are directed to permanent or semi-permanent systems for monitoring the state of hydrocarbon bearing formations that reside beneath bodies of water. The permanent or semi-permanent systems enable multiple three-dimensional surveys of the state of the hydrocarbon bearing formations taken over time, sometimes referred to as four dimension (4D) monitoring. In particular, the various embodiments are directed to a set of vertically oriented sensor streamers placed in operational relationship to the hydrocarbon bearing formation.

FIG. 1 shows a perspective cut-away view of a marine survey system 100 in accordance with at least some embodiments. In particular, FIG. 1 shows a marine environment comprising a surface 102 of the water (cut away so as not to obscure the underlying components), an earth formation 104 that comprises a hydrocarbon bearing formation 106, the sea-bottom 108 (use of the term "sea-bottom" shall not be read as a limitation to salt-water locations), along with a plurality of sensor systems 110. Only sensor systems 110A and 110B are specifically designated so as not to unduly complicate the figure. The sensor systems 102 are illustratively deployed in a grid pattern, and each sensor system 110 extends upwardly from the sea-bottom 108.

Referring specifically to sensor system 110A as representative of all the sensor systems 110, each sensor system 110 comprises a buoy 112, an anchor 114, and a sensor streamer 116. The buoy 112 provides a tensioning force for the sensor streamer 116, and the tensioning force tends to orient the sensor streamer 116 in a substantially vertical orientation. The anchor 114 holds the sensor streamer 116 and buoy 112 in place.

The illustrative grid pattern comprises spacing between the sensor systems of ΔX in an arbitrarily designated X direction, and a sensor spacing of ΔY in an arbitrarily designated Y direction. The actual spacing will vary for each particular installation based on parameters such as depth of the hydrocarbon bearing formation 106 beneath the sea-bottom 108, size of the hydrocarbon bearing formation 106, length of the sensor streamers 116, seismic velocity, electrical resistivity of the Earth, and type and frequency of the energy used to interrogate the hydrocarbon bearing formation 106 (e.g., acoustic energy, or electromagnetic energy).

The water depth 118 at the location of the marine survey system 100 will vary not only with location, but also with tides. In some cases, the length 120 of the sensor systems 110 will be approximately the same as the average water depth, such that the buoys 112 will reside at or near the surface. In cases where the buoys 112 reside at or near the surface, surface vessels (e.g., source vessel) can sail between the locations of the vertical streamers. In yet other embodiments, the length 120 of the sensor systems will be less than the average water depth 118, such that the buoys 112 of the sensor systems 110 reside below the surface 102 of the water. In a particular embodiment, the buoys 112 may reside sufficiently below the surface 102 to enable surface survey vessels to sail over the marine survey system 100 without encountering the sensor systems 110. For example, the buoys 112 may reside sufficiently below the surface 102 such that a survey vessel pulling a source of energy (e.g., acoustic energy, electromagnetic energy) can position the source of energy at various locations over and/or near the marine survey system 100 to interrogate the hydrocarbon bearing formation 106. As a non-limiting example of length of the sensor systems 110, in a location having a water depth of 100 meters, the length 120 of the sensor systems 110 may be about 75 meters. Another specific yet non-limiting example is a location having a water depth of 500 meters with the length 120 of the sensor systems 110 being about 450 meters. Longer or shorter lengths 120 may be used, including lengths that extend to the surface.

Still referring to FIG. 1, in some embodiments each individual sensor system 110 of the marine survey system 100 is mechanically unconnected to its neighbor sensor systems. Embodiments where no mechanical connection exists may work well in locations where the currents, tidal or otherwise, are relatively weak. However, in situations where water currents flowing through the marine survey system 100 are relatively strong, the amount of lateral displacement of the sensor systems 110 may be limited by coupling the sensor systems together at their distal ends. In particular, FIG. 1 shows a plurality of lines 150 that define a grid pattern. Illustrative FIG. 1 shows lines 150 only on the sensor systems 110 at the most distant locations from the point of view of FIG. 1 so as not to unduly complicate the figure; however, in a particular embodiment the lines 150 form a grid pattern covering the entire area delineated by the sensor system. At locations where the lines 150 intersect, the buoys 112 are coupled. In this way, the sensor systems 110 shift as group. The group thus resists shifting caused by steady state current, and wave-based currents (particularly with wavelengths less than the overall width or length of the marine survey system 100) may be dampened thus reducing the lateral movement of any particular sensor system 110.

Figure 2:
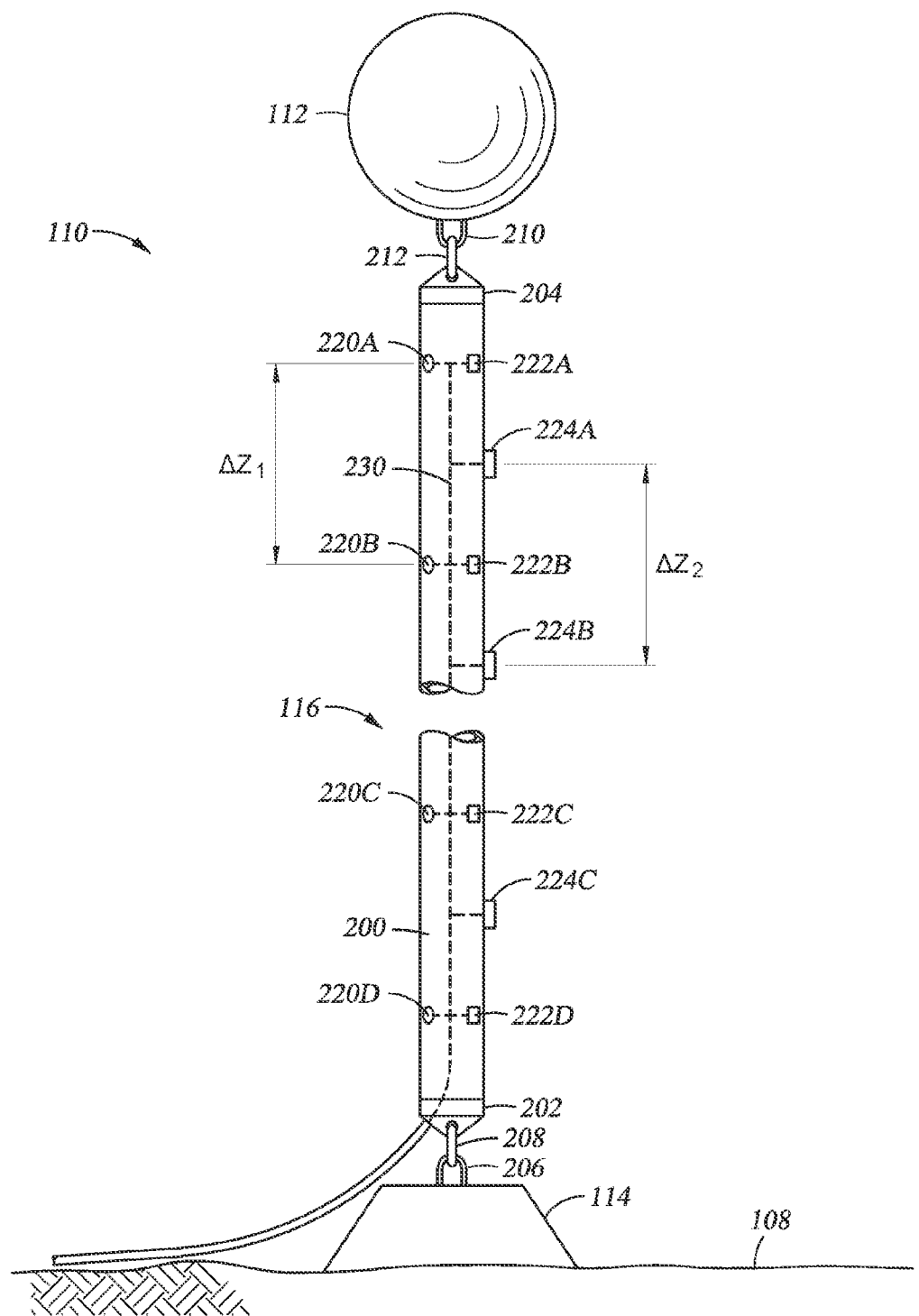
FIG. 2 shows an elevation view of a sensor system in accordance with at least some embodiments.

FIG. 2 shows a side elevation view of a sensor system in greater detail. In particular, FIG. 2 illustrates the anchor 114, sensor streamer 116, and buoy 112. FIG. 2 also illustrates aspects of the sensor streamer 116, such as an elongated outer jacket 200, coupling 202 on an end closest to the anchor 114, and coupling 204 on the distal end of the elongated outer jacket 200. Each component will be discussed in turn.

The anchor 114 contacts the sea-bottom 108 and holds the sensor system 110 in place. The anchor 114 can take any suitable form or shape, and as illustrated takes the form of a heavily weighted block. For example, the anchor 114 may be a concrete block, with or without steel reinforcement. In another embodiment, the anchor 114 may be a steel structure of any suitable form. The anchor 114 may sit on the sea-bottom 108, or may extend below the sea-bottom 108 as needed.

The anchor 114 couples to an elongated outer jacket 200 of the sensor streamer 116 by way of a coupling 202. In the illustrative embodiments of FIG. 2, the anchor 114 has an eyelet 206 and attaches to the coupling 202 by way of a link 208; however, any suitable system may be used to couple the anchor 114 to the coupling 202, such as a line. The mechanical connection between the coupling 202 and the anchor 114 enables the sensor streamer 116 to shift or rotate from its substantially vertical orientation, such as rotation caused by ocean currents, or to shift laterally when pushed aside by objects, such as the keel of a boat.

Still referring to FIG. 2, the sensor system 110 further comprises distal or upper coupling 204. The buoy 112 couples to the elongated outer jacket 200 by way of a coupling 204. In the illustrative embodiments of FIG. 2, the buoy 112 has an eyelet 210 and attaches to the coupling 204 by way of a link 212; however, any suitable system may be used to couple the buoy 112 to the coupling 204, such as a line. The mechanical connection between the coupling 204 and the buoy enables the buoy 112 to shift, such as shifting caused by ocean currents or when pushed aside by objects, such as the keel of a boat. In other embodiments, the buoy 112 may couple directly to the elongated outer jacket 200, and thus any movement caused by currents or objects may be of the buoy 112 and elongated outer jacket 200 as a group.

The buoy 112 is illustrated as a circular buoy; however, the positive buoyancy provided by the buoy 112 may be provided by any suitable shape and/or type of buoy. For example, in some embodiments the buoy may have an elongated shape such that the buoy orients itself to align with the prevailing currents, thus reducing the amount of shifting the sensor system 110 may experience when exposed to water currents.

Sensor streamer 116 comprises the elongated outer jacket 200. The elongated outer jacket 200 may take any suitable form. In a particular embodiment, the elongated outer jacket 200 is flexible and constructed of polyurethane. In some embodiments, the elongated outer jacket has an external diameter of between 55 and 67 millimeters, and in a particular embodiment about 62 millimeters. Other diameters, both larger and smaller, may be used depending on the number of sensors disposed within the elongated outer jacket 200. A number of components may reside within the elongated outer jacket 200, and such components will be discussed in more detail below. However, in some embodiments the sensor streamer 116 is neutrally buoyant, or slightly negatively buoyant, with the tensioning force supplied by the buoy 112 holding the sensor streamer in a substantially vertical orientation.

Still referring to FIG. 2, the sensor streamer 116 comprises a plurality of sensors. In a particular embodiment, the sensor streamer 116 comprises a plurality of hydrophones 220A-D (i.e., pressure gradient sensors) coupled to the elongated outer jacket 200, and more specifically coupled within the elongated outer jacket 200. As illustrated, the hydrophones 220 are spaced longitudinally along the elongated outer jacket (i.e., spaced along the long dimension of the elongated outer jacket 200), with the spacing indicated as $\Delta Z_1$. The spacing $\Delta Z_1$ can be uniform along the length of the sensor streamer (as shown), or non-uniform. The spacing between the individual hydrophones may change for each particular installation. Closer spacing is better, but for extended length sensor streamers 116 (e.g., 450 meter sensor streamers), economics may dictate larger spacing. In order to derive quality data from the hydrophones, spacing of not less than half the wavelength of the acoustic and/or seismic energy of the source provides better data, and spacing is dictated by the desired seismic resolution. Any suitable hydrophone may be used, such as the T-2BX hydrophone marketed by Teledyne Instruments, Inc. of Houston, Tex. Designating locations of the hydrophones with a circle is merely to distinguish the hydrophones from the other sensors, and not meant to imply any structural configuration of the hydrophones.

The sensor streamer 116 further comprises a plurality of three-axis motion detectors 222A-D coupled to the elongated outer jacket 200, and more specifically coupled within the elongated outer jacket 200. In a particular embodiment, the three-axis motion detectors 222 are spaced longitudinally along the elongated outer jacket and are substantially co-located with the hydrophones 220. The spacing between the individual three-axis motion detectors may change for each particular installation for the same reasons as discussed with respect to the hydrophones. The three-axis motion detectors 222 may take multiple forms. In one embodiment, each three-axis motion detector is a three-axis accelerometer, such as the IMEMSO brand three-axis accelerometer available from Analog Devices, Inc. of Norwood, Mass. Another commercially available accelerometer is the VECTORSEIS® brand device available from Input/Output, Inc. of Houston, Tex. In other embodiments, each three-axis motion detector may be a three-axis velocity phone (also known as a geophone or particle motion detector). Many commercially available three-axis velocity phones may be used, such as geophones available from Ion Geophysical of Houston, Tex. The use of squares in the drawing to identify the three-axis motion detectors is meant to distinguish the hydrophones from the other sensors, and is not meant to imply any structural configuration of the hydrophones.

Still referring to FIG. 2, sensor streamers 116 in accordance with at least some embodiments also comprise a plurality of electrodes 224A-C coupled to the elongated outer jacket 200. In the embodiments illustrated in FIG. 2, the electrodes 224 are spaced longitudinally along the elongated outer jacket 200 and are disposed between sets of co-located hydrophones 220 and three-axis motion detectors 222. The spacing of the three-axis motion detectors 222 is indicated as $\Delta Z_2$, which spacing can be uniform along the length or non-uniform. Inasmuch as the electrodes 224 are used to measure voltage potential at respective locations of the electrodes 224, the electrodes are electrically exposed outside the elongated outer jacket 200. As illustrated, electrically exposed may mean the electrodes are disposed on the outside of the elongated outer jacket 200, but in other embodiments the electrodes may reside within the elongated outer jacket 200, yet are exposed to the surrounding water, such as by apertures through the elongated outer jacket 200.

In order to read the data created by each of the sensors, a communication pathway 230 (shown in dashed line) is disposed within the elongated outer jacket 200. Thus, the communication pathway 230 communicatively couples to the sensors to enable reading data. The communication pathway may take many forms, such as one or more optical conductors, one or more electrical conductors, or combinations. The communications that take place over the communication pathway 230 may comprise analog communication, digital communication, communications by way of a communication protocol (e.g., Ethernet), or combinations. The communication pathway 230 is discussed more below with reference to FIG. 4.

Figure 3:
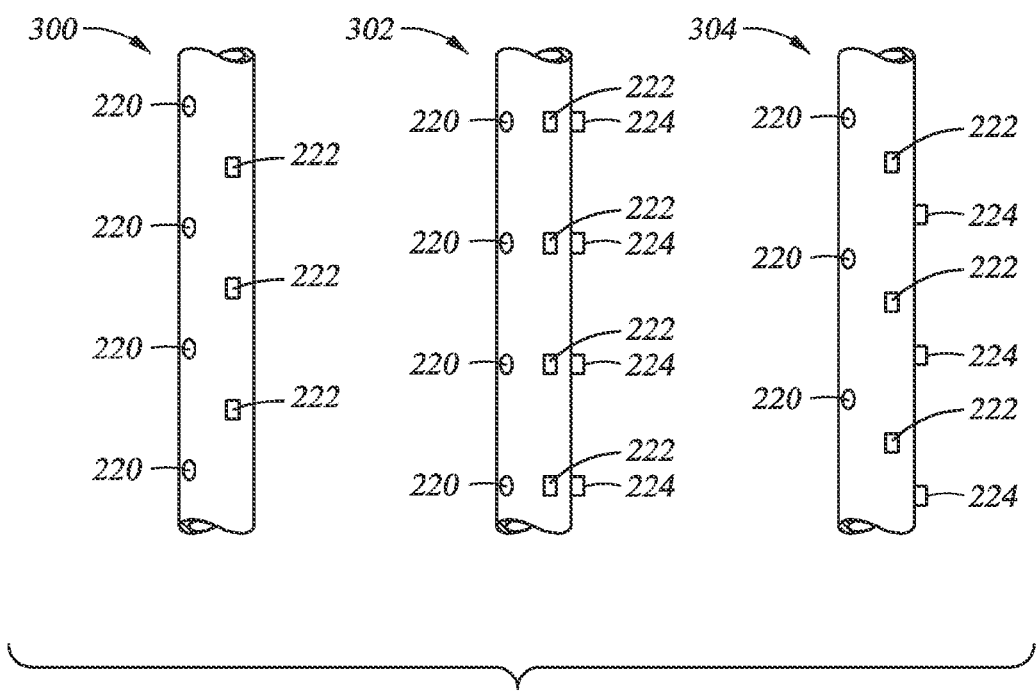
FIG. 3 shows side elevation views of example configurations of the sensor streamers in accordance with at least some embodiments.

FIG. 3 is a side elevation view of sensor streamers in accordance with other embodiments. In particular, sensor streamer 300 illustrates sensor streamers that omit the electrodes, and where the hydrophones 230 are not longitudinally co-located with the three-axis motion detectors 222. Sensor streamer 302 illustrates sensor streamers where the electrodes 224 are longitudinally co-located with one or both of the hydrophones 220 and the three-axis motion detectors 222. Sensor streamer 304 illustrates sensor streamers where none of the sensors are longitudinally co-located. The number of each type of sensor need not be the same. Even where hydrophones and three-axis motion detectors are longitudinally co-located at some locations, other longitudinal locations may have only a hydrophone or only a three-axis motion detector.

Figure 4:
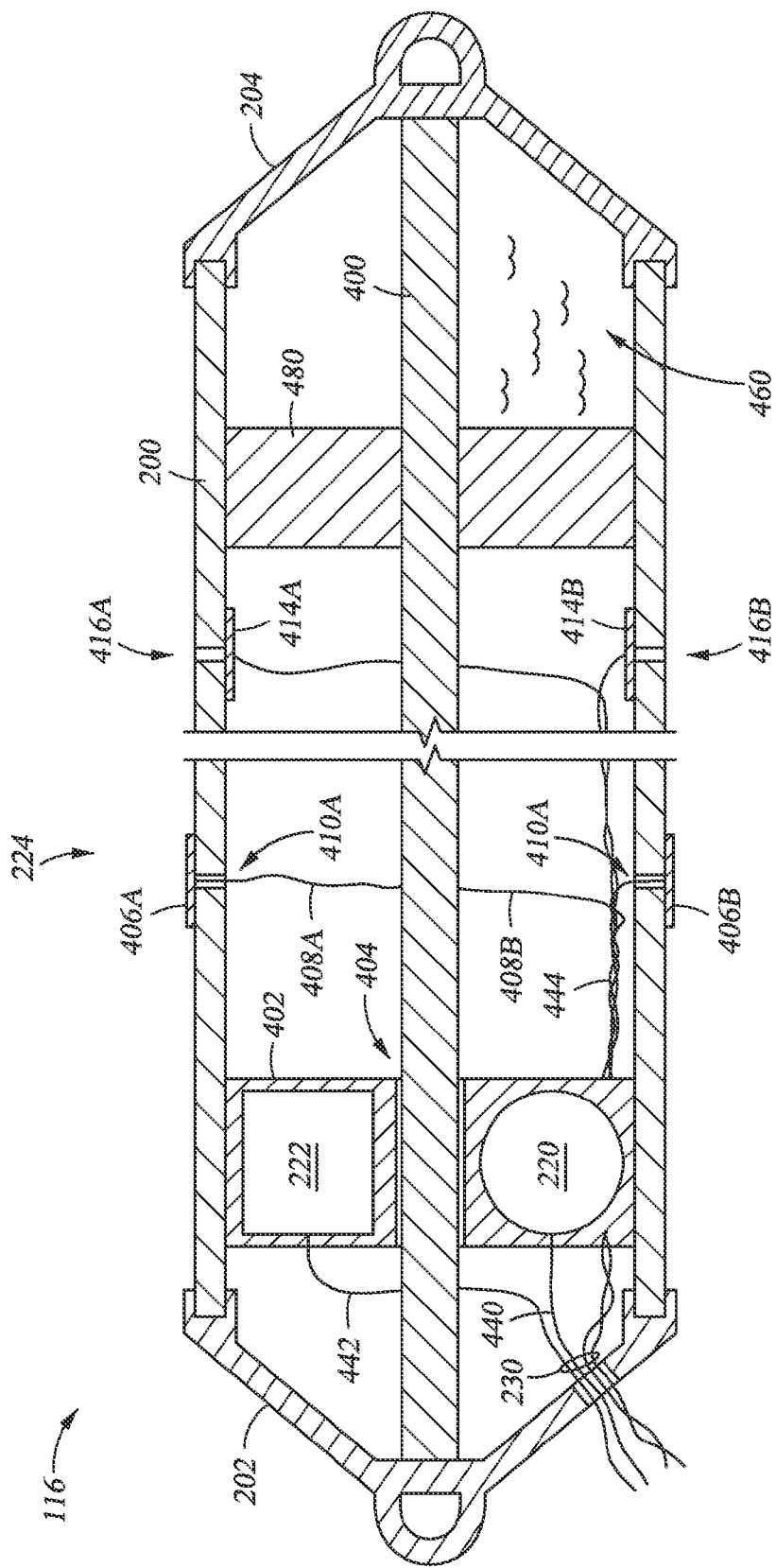
FIG. 4 shows a cross-sectional view of sensor streamer in accordance with at least some embodiments.

FIG. 4 shows a cross-sectional view of sensor streamer 116 in accordance with at least some embodiments. In particular, FIG. 4 shows the elongated outer jacket 200. In some embodiments, the elongated outer jacket is polyurethane, but any water resistant polymer material may be used. In many embodiments, the elongated outer jacket 200 is flexible, particularly extended length sensor streamers. In other embodiments, the elongated outer jacket 200 may be rigid, such as in the case of installations in shallow water where the sensor streamers are relatively short. The sensor streamer 116 couples to coupling 202 and coupling 204. The couplings 202 and 204 may be made of any suitable material, such as steel, stainless steel, and high density plastics. In some embodiments, the coupling 202 is made of different material than coupling 204, as the relative forces that each coupling must withstand may be different. Any suitable coupling mechanism between the couplings 202 and 204 and the elongated outer jacket 200 may be used, such as clamping, friction connections (i.e., the elongated outer jacket 200 forced over threads or directional barbs), and glue connections.

As mentioned above, in use the sensor streamer 116 is held in tension by the force supplied by buoy 112. In some cases, the mechanical connections between the couplings 202 and 204 and the elongated outer jacket 200, as well as the elongated outer jacket 200 itself, are sufficiently strong to hold the expected tensile forces, and thus no internal system need be present to carry the tension load. In other cases, the sensor streamer 116 may comprise a line 400 disposed within the elongated outer jacket and coupled on each end to the couplings 202 and 204. The length of the line 400 is selected such that tension forces applied between the couplings 202 and 204 are carried, at least on part, by the line 400. Thus, the elongated outer jacket 200 need not carry significant, if any, tensile forces. While illustrative FIG. 2 shows the line 400 disposed at the center of the elongated outer jacket 200, other placements, and number of lines 400, may be used. In a particular embodiment, the line 400 may be made from VECTRAN® brand fiber available from Hoechst Celanese Corp., New York, N.Y.

Still referring to FIG. 4, in accordance with at least some embodiments a co-located hydrophone 220 and three-axis motion detector 222 are disposed within a carrier assembly 402. The carrier assembly 402 as illustrated has a channel 404 through which the line 400 protrudes. The carrier assembly 402 may take any suitable form, such as the form described in commonly owned U.S. Pat. No. 7,881,159 (and referred to therein as spacers). In cases where the hydrophones are not co-located with the three-axis motion detectors 222, separate carrier assemblies may be used for each.

FIG. 4 also shows multiple example embodiments of electrodes. In particular, FIG. 4 shows an electrode 224 in the form of an electrode pair 406A-B. Thus, in some embodiments the voltage measurements taken by way of the electrode pair 406 are voltage or potential existing across the electrode pair 406. In other embodiments, voltage may be measured at an electrode 224 with respect to any suitable reference, such as another electrode spaced longitudinally from the electrode on the same sensor streamer. The illustrative electrode pair 406 further illustrates one embodiment having the electrode pair 406 electrically exposed on the elongated outer jacket 200. In particular, the electrodes of the electrode pair 406 are coupled directly to the outside diameter of the elongated outer jacket 200. In order to take voltage measurements, electrical conductors 408A-B couple to each electrode of the electrode pair 406 by way of apertures 410A-B through the elongated outer jacket 200. In order to seal the apertures 410 from water intrusion, either one or both of the electrodes of the electrode pair 406 are sealed to the elongated outer jacket 200 over the apertures 410, and/or the apertures 410 are sealed with a sealant.

FIG. 4 also illustrates other embodiments for placement of the electrodes such that the electrodes are electrically exposed outside the elongated outer jacket 200. In particular, the electrodes of the electrode pair 414 are disposed within the elongated outer jacket 200, but are nonetheless exposed to water that resides outside the elongated outer jacket 200 by way of apertures 416A-B. In order to seal the apertures 416 from water intrusion, the electrodes of the electrode pair 414 are sealed against the internal diameter of the elongated outer jacket 200 over the apertures 410.

In order to obtain data from the various sensors within the sensor streamer 116, and as discussed above, a communication pathway 230 resides within the elongated outer jacket 200. In the illustrative embodiment, the communication pathway 230 comprises a plurality of different communication sub-pathways. More particularly, in the illustrative embodiments of FIG. 4, each sensor type has a dedicated communication sub-pathway. For example, a first communication sub-pathway 440 may couple to the illustrative hydrophone 220, and in fact the communication sub-pathway may communicate with some or all the hydrophones in the sensor streamer 116, but such coupling is not shown in FIG. 4 so as not to unduly complicate the figure. The communication sub-pathway 440 may take any suitable form, such as an electrical conductor or optical conductor. The communication over the communication sub-pathway 440 may likewise take any suitable form or protocol, such as analog, digital, or a digital packet-based message system.

FIG. 4 further shows another communication sub-pathway 442 coupled to the illustrative three-axis motion detector 222, and in fact the communication sub-pathway 442 may communicate with some or all the three-axis motion detectors 222 in the sensor streamer 116, but such coupling is not shown in FIG. 4 so as not to unduly complicate the figure. The communication sub-pathway 442 may take any suitable form, such as an electrical conductor or optical conductor. The communication over the communication sub-pathway 440 may likewise take any suitable form or protocol, such as analog, digital, or a digital packet-based message system. In some cases, the communication sub-pathway used by the three-axis motion detectors 222 may be the same as the communication sub-pathway used by the hydrophones 220, particularly where a packet-based communication system and protocol is implemented.

FIG. 4 further shows a third communication sub-pathway 444 in the form of the conductors 408 coupled to the illustrative electrode pair 406. In a particular embodiment, the communication sub-pathway 444 couples to a plurality of electrodes and/or electrode pairs, but such coupling is not shown in FIG. 4 so as not to unduly complicate the figure. The communication sub-pathway 444 may take any suitable form, such as a pair of electrical conductors in the case where voltage measurements are read by a distance device. In other cases, the electronics to perform the voltage measurements across the electrode pairs may be placed proximate to the electrode pair, and thus the analog measurements may be converted to a digital form and communicated by way of message packets. Here too, the communication sub-pathway 444 may also take any suitable form, such as analog, digital, or a digital packet-based message system.

Still referring to FIG. 4, in at least some embodiments the sensor streamer 116 is neutrally buoyant. In order to achieve neutral buoyancy given the various components disposed within the elongated outer jacket, in some cases the sensor streamer 116 further comprises a buoyancy void filler 460. The buoyancy void filler is shown disposed only at one location in FIG. 4 so as not to unduly complicate the figure, but it will be understood that in some cases the buoyancy void filler fills all voids within the internal volume of the elongated outer jacket 200. In some cases, the buoyancy void filler is a liquid having a specific gravity less than water, such as mineral oil (which also acts to electrically isolate the internal components). In other cases, the buoyancy void material 460 may be low viscosity liquid in its uncured state, but upon curing increase in viscosity to become a gel, semi-solid, or solid in form. In cases where the buoyancy void filler 460 is a liquid, one or more baffles 480 may be installed to reduce movement liquid caused by movement of the sensor streamer 116.

Figure 5:
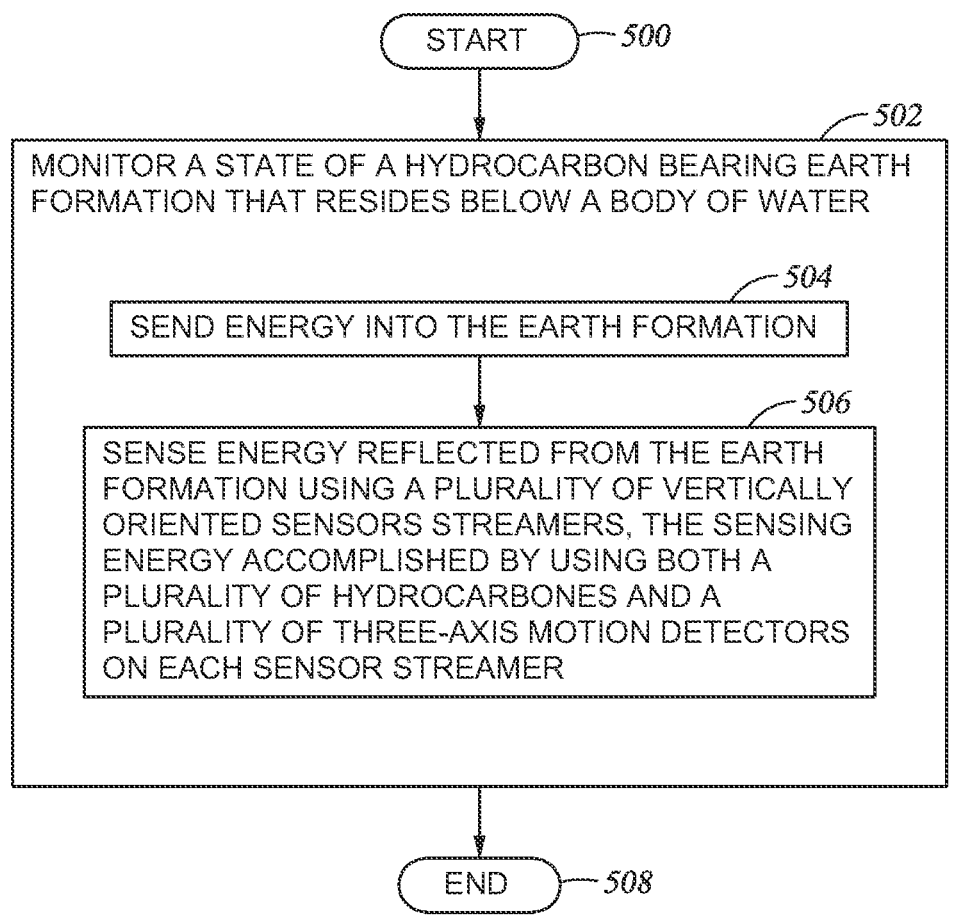
FIG. 5 shows a method in accordance with at least some embodiments.

FIG. 5 shows a method in accordance with at least some embodiments. In particular, the method starts (block 500) and comprises monitoring a state of a hydrocarbon bearing earth formation that resides below a body of water (block 502). The monitoring comprises: sending energy into the earth formation (block 504); and sensing energy reflected from the earth formation by way of a plurality of vertically oriented sensor streamers, the sensing accomplished by using both a plurality of hydrophones and a plurality of three-axis motion detectors on each sensor streamer (block 506). Sending energy into the formation may comprise sending acoustic energy, sending electromagnetic energy, or both. The acoustic and electromagnetic energy may be sent simultaneously, or at different times. In the case of sensing electromagnetic energy, the sensing may be accomplished by using a plurality of electrodes on each of the vertically oriented sensor streamers. Thereafter, the method ends (block 508), or may be repeated.

For 4D monitoring of hydrocarbon producing earth formation, multiple monitoring sessions may be performed over time. For example, the earth formation may be monitored by sending energy into the formation and sensing reflected energy by the substantially vertical sensor streamers, refraining for some period of time (e.g., a month, six months, a year) during which time hydrocarbons are extracted from the earth formation, and then sending energy again into the formation and sensing reflected energy.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, each sensor streamer 116 may comprise multiple individual sections electrically and mechanically coupled end-to-end to form each overall streamer 116. It is intended that the following claims be interpreted to embrace all such variations and modifications.

What is claimed is:

1. A sensor system comprising:
   a buoy;
   an anchor;
   a sensor streamer coupled between the buoy and the anchor, the sensor streamer comprising:
   an elongated outer jacket;
   a first coupling on a first end of the elongated outer jacket, the first coupling coupled to the buoy;
   a second coupling on a second end of the elongated outer jacket, the second end opposite the first end, the second coupling coupled to the anchor;
   a line disposed within the outer jacket, the line coupled on a first end to the first coupling, and the line coupled on a second end to the second coupling;
   wherein the line has a length such that a tension force applied between the buoy and the anchor is carried at least in part by the line; and
   a plurality of hydrophones coupled to the outer jacket, each hydrophone of the plurality of hydrophones longitudinally spaced along the outer jacket; and
   a plurality of three-axis motion detectors, each three-axis motion detector of the plurality of three-axis motion detectors longitudinally spaced along the outer jacket;
   a first rope coupled at the distal end of the buoy proximate the first coupling, the first rope couples to a buoy of a first adjacent sensor system; and
   a second rope coupled at the distal end of the buoy proximate the first coupling, the second rope couples to a buoy of a second adjacent sensor system;
   wherein the first rope and second rope are distinct from the line disposed within the outer jacket.

2. The sensor system of claim 1 wherein each hydrophone of the plurality of hydrophones is substantially co-located with a three-axis motion detector of the plurality of three-axis motion detectors.

3. The sensor system of claim 2 wherein the sensor streamer further comprises a plurality of electrodes coupled to the outer jacket, the plurality of electrodes longitudinally spaced along the outer jacket, and the plurality of electrodes electrically exposed outside the outer jacket.

4. The sensor system of claim 3 further comprising a communication pathway disposed within the elongated outer jacket, the communication pathway being at least one selected from the group consisting of: an optical conductor; and an electrical conductor.

5. The marine survey system of claim 3 where each sensor system further comprises a communication pathway disposed within the elongated outer jacket, the communication pathway being at least one selected from the group consisting of: an optical conductor; and an electrical conductor.

6. The sensor system of claim 3 wherein at least one electrode of the plurality of electrodes is disposed between two sets of co-located hydrophone and three-axis motion detector.

7. The sensor system of claim 3 wherein at least one electrode of the plurality of electrodes is substantially co-located with a hydrophone of the plurality of hydrophones and a three-axis motion detector of the plurality of three-axis motion detectors.

8. The sensor system of claim 1 wherein the sensor streamer further comprises a plurality of electrodes coupled to the outer jacket, the plurality of electrodes longitudinally spaced along the outer jacket, and the plurality of electrodes electrically exposed outside the outer jacket.

9. The sensor system of claim 8 further comprising a communication pathway disposed within the elongated outer jacket, and the communication pathway communicatively coupled to the plurality of hydrophones, the plurality of three-axis motion detectors, and the plurality of electrodes.

10. The sensor system of claim 1 wherein each of the plurality of thee-axis motion detectors is at least one selected from the group consisting of: a three-axis accelerometer; and a three-axis velocity phone.

11. A marine survey system comprising:
    a plurality of sensor systems deployed in a grid pattern, and each sensor system of the plurality of sensor systems extending upward from a bottom of a body of water, each sensor system comprising:
    a buoy;
    an anchor contacting the bottom;
    an elongated outer jacket, the elongated outer jacket coupled on a first end to the buoy, and the elongated outer jacket coupled on a second end to the anchor;
    a plurality of hydrophones coupled to the outer jacket, each hydrophone of the plurality of hydrophones longitudinally spaced along the outer jacket; and
    a plurality of three-axis motion detectors, each three-axis motion detector of the plurality of three-axis motion detectors longitudinally spaced along the outer jacket,
    a plurality of ropes that define a grid pattern, the grid pattern of the plurality of ropes substantially parallel to the sea floor, and the plurality of ropes disposed at a depth proximate the first end of each sensor system; and
    the buoy of each sensor system disposed at intersections of two or more of the plurality of ropes.

12. The marine survey system of claim 11 wherein each hydrophone of the plurality of hydrophones is substantially co-located with a three-axis motion detector of the plurality of three-axis motion detectors.

13. The marine survey system of claim 12 wherein each sensor system further comprises a plurality of electrodes coupled to the outer jacket, the plurality of electrodes longitudinally spaced along the outer jacket, and the plurality of electrodes electrically exposed outside the outer jacket.

14. The marine survey system of claim 13 wherein at least one electrode of the plurality of electrodes is disposed between two sets of co-located hydrophone and three-axis motion detector.

15. The marine survey system of claim 13 wherein at least one electrode of the plurality of electrodes is substantially co-located with a hydrophone of the plurality of hydrophones and a three-axis motion detector of the plurality of three-axis motion detectors.

16. The marine survey system of claim 11 wherein each sensor system further comprises a plurality of electrodes coupled to the outer jacket, the plurality of electrodes longitudinally spaced along the outer jacket, and the plurality of electrodes electrically exposed outside the outer jacket.

17. The marine survey system of claim 16 wherein each sensor system further comprises a communication pathway disposed within the elongated outer jacket, and the communication pathway communicatively coupled to the plurality of hydrophones, the plurality of three-axis motion detectors, and the plurality of electrodes.

18. The marine survey system of claim 11 wherein each of the plurality of thee-axis motion detectors is at least one selected from the group consisting of: a three-axis accelerometer; and a three-axis velocity phone.

19. The marine survey system of claim 11 where each buoy is positioned below a surface of the body of water.

20. The marine survey system of claim 11 wherein at least two of the sensor systems are coupled proximate to their respective buoys by way of a line.

21. The marine survey system of claim 11 further comprising a plurality of lines defining a grid pattern, and wherein buoys of the sensor systems couple at intersections of two or more of the plurality of lines.

\* \* \* \* \*